US009311573B2

(12) United States Patent
Moroney et al.

(10) Patent No.: US 9,311,573 B2
(45) Date of Patent: Apr. 12, 2016

(54) APPARATUS, SYSTEM, AND METHOD FOR PRINTING ON VARIABLE FORM MEDIA

(75) Inventors: Brian W. Moroney, Longmont, CO (US); Dwight R. Palmer, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 927 days.

(21) Appl. No.: 12/578,197

(22) Filed: Oct. 13, 2009

(65) Prior Publication Data

US 2010/0073728 A1     Mar. 25, 2010

Related U.S. Application Data

(62) Division of application No. 10/746,891, filed on Dec. 24, 2003, now abandoned.

(51) Int. Cl.
*G06K 15/02* (2006.01)

(52) U.S. Cl.
CPC ............. *G06K 15/02* (2013.01); *G06K 15/021* (2013.01)

(58) Field of Classification Search
USPC ............... 358/1.15, 1.18, 448, 404, 1.12, 451
See application file for complete search history.

(56) References Cited

U.S. PATENT DOCUMENTS 5,337,161 A * 8/1994 Hube .......................... 358/448
5,946,461 A * 8/1999 Landry et al. ................ 358/1.18

* cited by examiner

*Primary Examiner* — Allen H Nguyen
(74) *Attorney, Agent, or Firm* — Duft Bornsen & Fettig LLP (57) ABSTRACT

An apparatus, system, and process for printing on variable form media are provided. Variable form media has a variety of physical configurations. Each physical configuration may have a unique print target for receiving printing. The apparatus, system, and process include a computer configured to receive text information. The computer organizes the text information as relocatable print data. The relocatable print data may be printed at one or more print targets on one or more variable form medias. Each print target has a distinct position, orientation, and dimensions. The computer further calculates spatial print data directed to a specific variable form media from the relocatable print data. The spatial print data specifies the position, orientation, and dimension of the relocatable print data. The apparatus, system, and process print the spatial print data on the variable form media. In addition, the apparatus, system, and process may render the spatial print data and the variable form media on a display.

12 Claims, 8 Drawing Sheets

APPARATUS, SYSTEM, AND METHOD FOR PRINTING ON VARIABLE FORM MEDIA

CROSS-REFERENCES TO RELATED APPLICATIONS

This non-provisional patent application is a divisional of U.S. patent application Ser. No. 10/746,891, filed Dec. 24, 2003, now abandoned which is incorporated by reference herein.

BACKGROUND OF THE INVENTION

1. Field of the Invention

This invention relates to printing on a variable form media and more particularly relates to printing relocatable print data on the variable form media.

2. Description of the Related Art

Many printed documents include variable form media ("VFM") such as tab pages or page dividers in addition to standard printed pages. VFM has a variety of physical configurations, many with a tab extending beyond the dimensions of a document's standard printed pages. Text information printed on the tab may identify the tab section to a reader without the reader opening the document. VFM is effective for organizing and demarking the sections of a printed document. A document will often have multiple VFMs, each with a unique physical configuration. The unique physical configuration of each VFM often requires that the text information be printed in a unique print target location that is different from one or more other VFM in the document.

Many printers include feed mechanisms that support the printing of the VFM along with the standard printed pages of a document, automatically printing and collating VFM into a document as the rest of the document is printed. Unfortunately, setting up the source document to print on VFM is often inconvenient. The print targets for text information differ among the different physical configurations of VFM. For example, each tab in a set of tab pages typically has a unique print target location. To print on a tab page VFM, a user must create a tab page within the document for each tab and specify the tab text and format at the print target position and orientation of the tab. Thus the user must determine the appropriate tab location and enter specific spatial print data in order to print the VFM in sequence with standard printed pages.

Figure 1A:
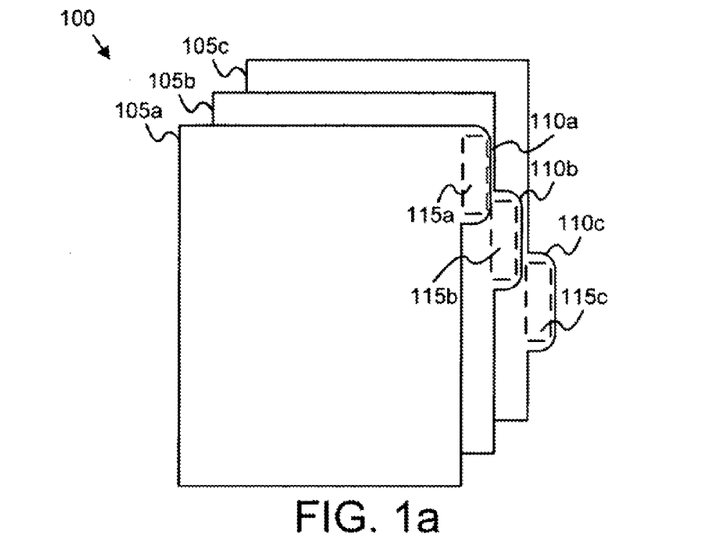
FIG. 1*a* is an illustration of variable form media of the current practice.

FIG. 1a illustrates a set of VFM 100 of the current practice. The set of VFM 100 includes one or more VFM 105, one or more tabs 110, and one or more print targets 115. The set of VFM 100 demarks one or more sections of a document with page stock, text, and images that are visible without opening the document.

The set of VFM 100 typically includes one or more VFM 105, each with a unique physical configuration. Each VFM 105 may include one or more tabs 110 and one or more print areas 115. Although the set of VFM 100 is shown with three VFM 105 with one tab 110 and one print target 115 each, any number of VFM 105, tabs 110, and print targets 115 may be included in the set of VRM 100. Text information such as text and images are typically printed in the print target 115 of each VFM 105 to identify the section of the document demarked by the VFM 105.

Figure 1B:
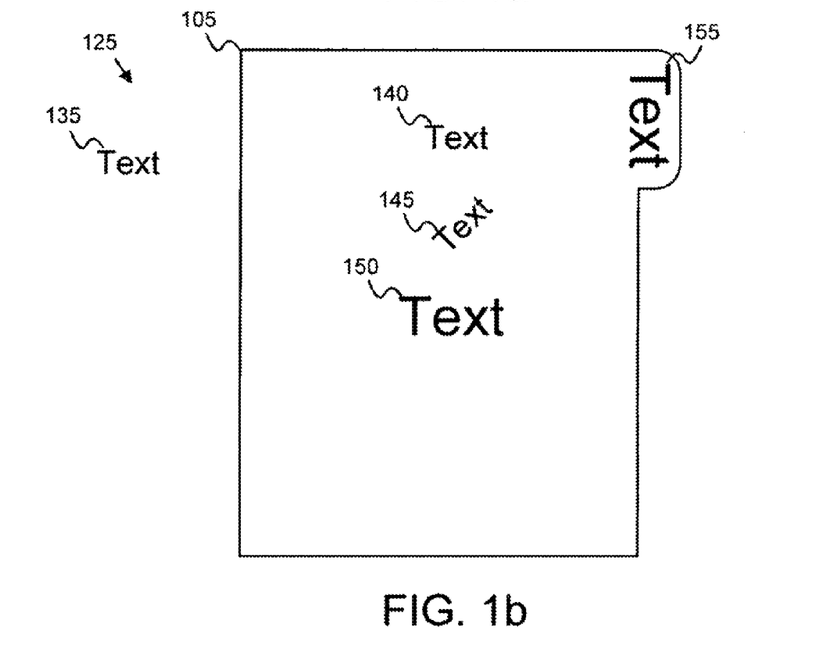
FIG. 1*b* is an illustration of print data of the current practice.

FIG. 1b illustrates print data 125 of the current practice. Text information 135 specifies the text and images to be printed, as well as the fonts and the relationships of text and images of the text information 135. The text information 135 does not specify the position, orientation, or dimensions the text and images will occupy on a printed page. Information specifying the position of the text information 135 may be added to create positioned print data 140. Orientation information may also be added to the text information 135 to create oriented print data 145. In addition, dimension information may be added to the text information 135 to create dimensioned print data 150. Spatial print data 155 combines text information 135, position information, orientation information, and dimension information to specify the printing of the text information 135 on the VFM 105.

Figure 1C:
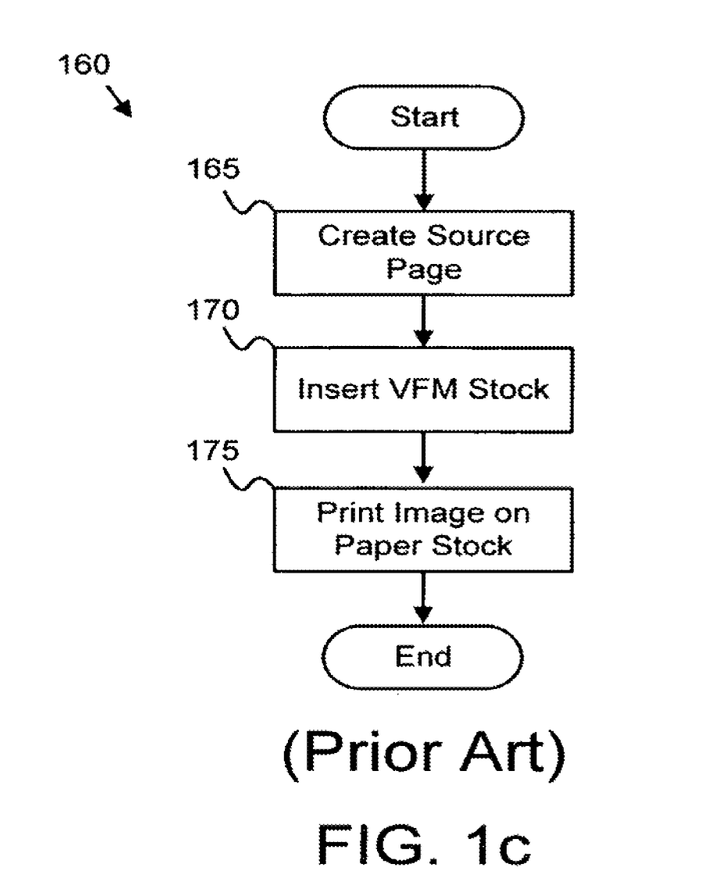
FIG. 1*c* is a flow chart illustrating a variable form media printing method of the current practice.

FIG. 1c is a flow chart illustrating a VFM printing method 160 of the current practice. The VFM printing method 160 prints text information 135 to a VFM 105 such as a tab page. The VFM printing method 160 creates 165 a source page. The source page describes the VFM 105 text information 135 as spatial print data 155 within a print target 115 on the VFM 105. The VFM printing method 160 inserts 170 the correct VFM 105 into a printer. The VFM 105 is typically placed in a separate paper feed distinct from the paper feed used for standard printing paper.

The VFM printing method 160 subsequently prints 175 the source page on the VFM 105. The printer feeds the VFM 105 from the paper feed into a print engine and prints the source page onto the VFM 105. If the print target 115 of the VFM 105 does not match the spatial print data 155 of the source page, the VFM 105 will be incorrectly printed and may be useless for organizing the document.

The VFM 105 printing method 160 requires a user to create a source page that describes the position, orientation, and dimensions of text information 135 at a print target 115 on the VFM 105. Unfortunately, the VFM 105 printing method 160 cannot properly describe text information 135 if the user does not know the physical configuration of each VFM 105 in a final document. For example, a source page may be created by placing text in the print target 115b of the tab 10b positioned five centimeters (5 cm) below the top of the VFM 105b. Yet if the printer prints the source page on the VFM 105c with the print target 115c of the tab 110c positioned ten centimeters (10 cm) below the top of the VFM 105c, the text information 135 of the source page will not be printed within the print target 115c because there will be no media in the tab 110b to print upon. The text information 135 can only be printed on the VFM 105b with the tab 110b positioned five centimeters (5 cm) below the top of the VFM 105b.

The document in the VFM printing method 160 would also not print correctly if the user created the source document directed to one or more VFM 105 with a first type of physical configuration, such as a set of VFM 100 with six-centimeter (6 cm) tabs, then attempted to print the source document on one or more VFM 105 with an alternate physical configuration, such as a set of VFM 100 with five-centimeter (5 cm) tabs. The printer would attempt to print the spatial print data 155 of the source pages in the print targets 115 for the six-centimeter (6 cm) tabs, printing the spatial print data 155 in areas inappropriate for five-centimeter (5 cm) tabs Consequently, a need exists for a process, apparatus, and system that create relocatable print data from text information 135 directed to a VFM 105. What is further needed are a process, apparatus, and system that calculate spatial print data 155 directed to a print target 115 of the VFM 105. Beneficially, such a process, apparatus, and system would allow a user to define the printed content of the VFM 105 independent of any proceeding or succeeding VFM 105, or the physical configuration of the VFM 105.

BRIEF SUMMARY OF THE INVENTION

The present invention has been developed in response to the present state of the art, and in particular, in response to the problems and needs in the art that have not yet been fully solved by currently available printing methods. Accordingly, the present invention has been developed to provide a process, apparatus, and system for creating and printing relocatable print data on variable form media ("VFM") that overcome many or all of the above-discussed shortcomings in the art.

The apparatus for printing is provided with a logic unit containing a plurality of modules configured to functionally execute the necessary steps of rendering text information 135 on VFM 105. In one embodiment, the apparatus is a print-processing device such as a print server and a printer. These modules in the described embodiments include a print interface module, a print processor module, a paper feed module, and a print engine module.

The print interface module, in one embodiment, is configured to receive relocatable print data. The relocatable print data may include text information 135 such as text, image, and formatting information organized independently of position, orientation, and dimensions. In one embodiment, the relocatable print data is included in a job ticket. In an alternate embodiment, the relocatable print data is included in a document.

In one embodiment, the print processor module calculates spatial print data 155 directed to a VFM 105 from the relocatable print data. The spatial print data 155 specifies the dimensions, location, and orientation of the text information 135 as it is to be printed in the print target 115 of the VFM 105. The paper feed module positions the VFM 105 to the print engine module. The print engine module prints the spatial print data 155 upon the VFM 105. The apparatus is further configured, in one embodiment, to communicate the physical configuration of the VFM 105 to the print processor. The print processor may calculate the spatial print data 155 in response to the physical configuration of the VFM 105.

In one aspect of the present invention, an apparatus for creating relocatable print data is presented. In one embodiment, the apparatus is a data processing device such as a computer, a server, a personal digital assistant, a print server, and a printer. The apparatus includes an I/O module and a processor module. The I/O module receives text information 135 directed to a VFM 105. In one embodiment, a set of VFM 100 is specified. In an alternate embodiment, a general functional description of the VFM 105 is specified. The processor module organizes the relocatable print data from the text information 135.

In an alternate aspect of the present invention, an apparatus is presented for rendering relocatable print data. In one embodiment, the apparatus is a data processing device such as a computer, a server, a personal digital assistant, a print server, and a printer. The apparatus includes a processor module and interface module. The processor module calculates spatial print data 155 directed to a VFM 105 from relocatable print data. The interface module communicates the spatial print data 155 to a rendering device. In one embodiment, the rendering device is a printer.

A system of the present invention is also presented for printing. The system may be embodied in a data processing network. In particular, the system, in one embodiment, includes a computer, a network, and a printer. The computer calculates spatial print data 155 directed to a VFM 105 from relocatable print data. The network communicates the spatial print data 155 to the printer. The printer prints the spatial print con data 155 upon the VFM 105.

In one embodiment, the computer organizes the relocatable print data from text information 135 directed to a VFM 105. The system may further include a display. In one embodiment, the computer renders an image of the spatial print data 155 and the VFM 105 on the display. In an alternate embodiment, the computer renders the image of the spatial print data 155 and the VFM 105 as a web page.

A process of the present invention is also presented for creating relocatable print data. The process in the disclosed embodiments substantially includes the steps necessary to carry out the functions presented above with respect to the operation of the described apparatus and system. In one embodiment, the process includes receiving text information 135, organizing the text information 135 as relocatable print data, appending the relocatable print data to a document, receiving the relocatable print data from the document, calculating spatial print data 155, and rendering the spatial print data 155.

The process receives text information 135 directed to a VFM 105. In one embodiment, text information 135 is directed to a set of VFM 100 with one or more specific physical configurations. In an alternate embodiment, the text information is directed to a VFM 105 with a general functional description, such as a tab sheet. The process organizes the text information 135 as relocatable print data independent of position, orientation, and dimensions.

In one embodiment, the relocatable print data defines the rendering of the text information within a print target 115. The process appends the relocatable print data to a document. In addition, the process receives the relocatable print data from the document. The process calculates spatial print data 155 directed to a VFM 105, and renders the spatial print data 155 on the VFM 105. In one embodiment, the process prints the spatial print data 155 on the VFM 105. In an alternate embodiment, the process displays the spatial print data 155 and the VFM 105 on a display.

The present invention organizes relocatable print data from text information 135. The relocatable print data specifies the text information 135 independent of position, orientation, and dimensions. The present invention further calculates spatial print data 155 directed to a VFM 105 from the relocatable print data. The spatial print data 155 specifies the position, orientation, and dimensions of the text information 135. The present invention prints the spatial print data 155 on the VFM 105. Alternately, the present invention may render the spatial print data 155 and the VFM 105 on a display. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
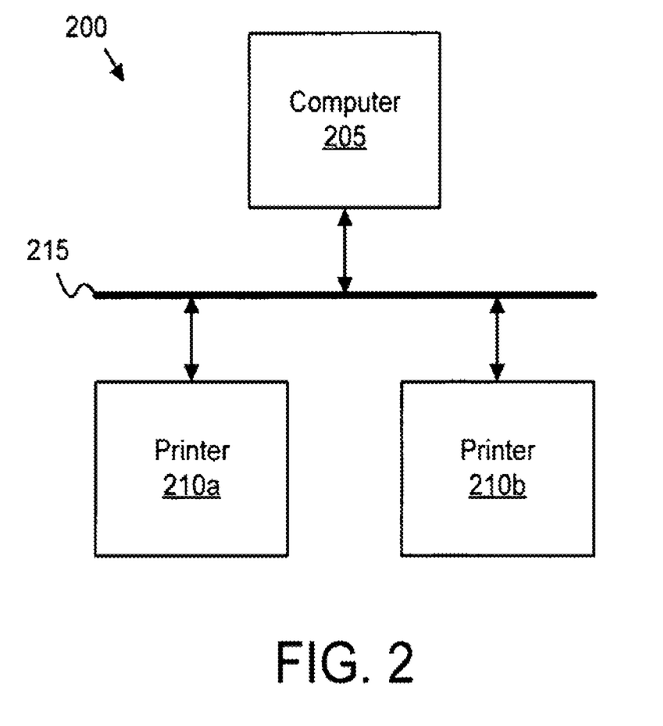
FIG. 2 is a block diagram illustrating one embodiment of a printing system of the present invention.

FIG. 2 depicts a block diagram illustrating one embodiment of a printing system 200 of the present invention. The printing system 200 includes a data processor i.e. a computer 205, one or more printers 210, and a network 215. Although the printing system 200 is depicted with one computer 205, one network 215, and two printers 215, any number of computers 205, networks 215, and printers 210 may be employed. Although for simplicity the data processor is depicted as a computer 205, the data processor may be a computer, a server, a print server, or a personal digital assistant.

In one embodiment, the computer 205 receives text information 135 directed to a variable form media ("VFM") 105. In one embodiment, the text information is input by a user. In an alternate embodiment, the text information is created by a software application such as a data base application, order entry application, and identification application. The VFM 10S may include tab pages and page dividers. In one embodiment, the VFM 105 is a set of VFM 100 with one or more specified physical configurations. In a certain embodiment, the VFM 105 specifies one or more physical dimensions. In an alternate embodiment, the VFM 105 has a general functional description such as a tab page.

The computer 205 organizes relocatable print data from the text information 135. In one embodiment, the relocatable print data describes the rendering of the text information 135 within a print target 115 independent of the position, orientation, and dimensions of the print target 115. In a certain embodiment, the relocatable print data specifies a set of VFM 100 that the text information 135 is directed to. In an alternate embodiment, the relocatable print data specifies a general description of the VFM 105 that the text information 135 is directed to. The computer 205 appends the relocatable print data to a document. In one embodiment, the relocatable print data is included as part of a job ticket. The job ticket contains the finishing information for the document including binding, special media requirements, and collating instructions. In an alternate embodiment, the relocatable print data is integrated with the document.

The computer 205 calculates spatial print data 155 directed to a VFM 105 from the relocatable print data. The spatial print data 155 specifies the position, orientation, and dimensions of the relocatable print data. In one embodiment, the spatial print data 155 is directed to a print target 115. The print target 115 may be one or more print targets 115 of the VFM 105 capable of receiving printing.

In one embodiment, the computer 205 calculates the spatial print data 155 directed to an alternate VFM 105 as the number, physical configuration, and sequential position of the VFM 105 in the document changes. For example, if the relocatable print data directed to a second VFM 105 in a set of VFM 100 is deleted, the computer 205 may calculate the spatial print data 155 of relocatable print data initially associated with the third sequential position of the document as directed to the second VFM 105 of the document. Alternatively, if new relocatable print data directed to a fourth VFM 105 in the set of VFM 100 is appended to the document, the computer 205 calculates the spatial print data 155 for the existing relocatable print data initially directed to the fourth VFM 105 of the document as directed to a fifth VFM 105 of the document.

In one embodiment, the spatial print data 155 is directed to a VFM 105 from a set of VFM 100. In a certain embodiment, a user selects the VFM 105. In an alternate embodiment, the computer 205 queries one or more printers 210 to determine the physical configuration of the VFM 105 residing in each printer 210.

The computer 205 communicates the spatial print data 155 to the printer 210. In one embodiment, the computer 205 communicates the spatial print data 155 to the printer 210a containing the VFM 105 specified by the spatial print data 155. In an alternate embodiment, the computer 205 directs a user to load the VFM 105 into the printer 210. The printer 210 prints the spatial print data 155 on the VFM 105. The printing system 200c, organizes relocatable print data independent of the physical configuration of VFM 105. The printing system 200 further prints the relocatable print data as spatial print data 155 on the VFM 105.

Figure 3:
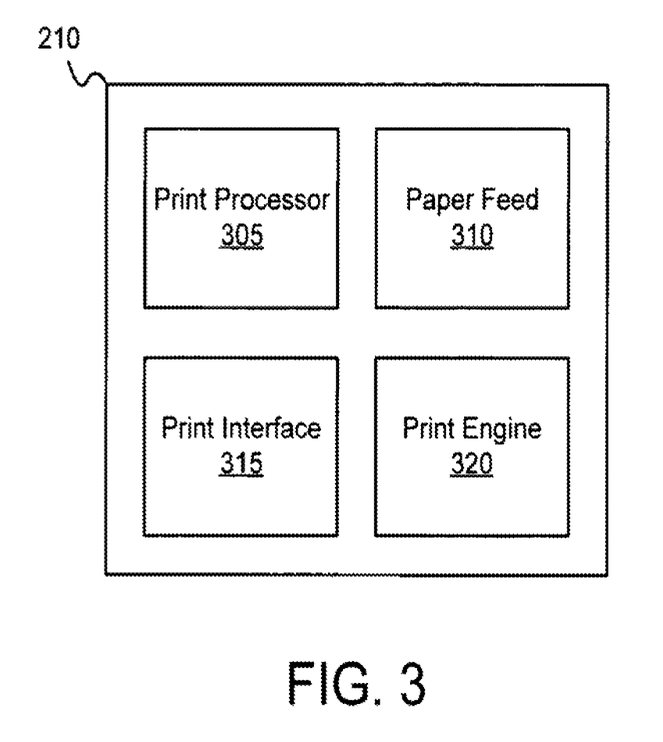
FIG. 3 is a block diagram illustrating one embodiment of a printer of the present invention.

FIG. 3 depicts a block diagram illustrating one embodiment of a printer 210 of the present invention. The printer 210 includes a print processor module 305, a paper feed module 310, a print interface module 315, and a print engine module 320. The printer 210 prints relocatable print data on a VFM 105.

The print interface module 315 receives relocatable print data. The print processor module 305 calculates spatial print data 155 from the relocatable print data. The spatial print data 155 is directed to a VFM 105. In one embodiment, the VFM 105 may be selected responsive to a previously printed VFM 105, such as directing the spatial print data 155 to the third VFM 105c of a set of VFM 100 subsequent to printing the second VFM 105b of a set of VFM 100. In an alternate embodiment, VFM 105 may be selected by the user. In a certain embodiment, the print processor module 305 selects the VFM 105 positioned for printing in the paper feed module 310.

The paper feed module 310 positions the VFM 105 relative to the print engine 320. The print engine 320 prints the spatial print data 155 on the VFM 105. In one embodiment, the spatial print data 155 is printed within a print target 115. The printer 210 calculates the spatial print data 155 from relocatable print data and prints the spatial print data 155 on a specified VFM 105.

Figure 4:
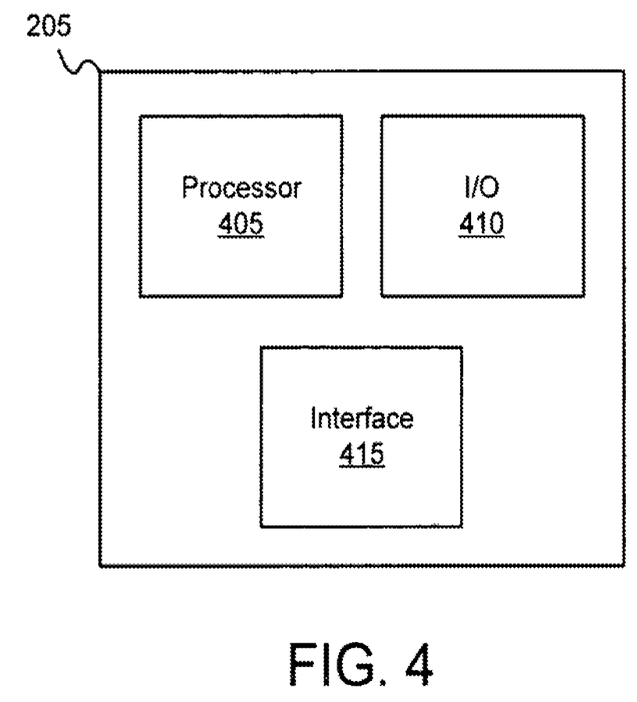
FIG. 4 is a block diagram illustrating one embodiment of a computer of the present invention.

FIG. 4 depicts a block diagram illustrating one embodiment of a computer 205 of the present invention. The computer 205 includes a processor module 405, an I/O module 410, and an interface module 415. The computer 205 organizes relocatable print data from text information 135 and calculates spatial print data 155 directed to a VFM 105 from the relocatable print data.

In one embodiment, the I/O module 410 receives text information 135. The I/O module may be a keyboard, a screen, a mouse, a touch screen, an input pad, a scanner with optical character recognition software, and a microphone with voice recognition software. In an alternate embodiment, the I/O module receives text information from a software application such as a data base application, an order entry application, or an identification application. In a certain embodiment, the text information 135 is directed to a set of VFM 100 with one or more specified physical configurations. In an alternate embodiment, the VFM 105 has a general functional description. The processor module 405 organizes the relocatable print data from the text information 135.

In one embodiment, the processor module 405 calculates spatial print data 155 from the relocatable print data. The spatial print data 155 is directed to a VFM 105. In one embodiment, the VFM 105 is selected from a set of VFM 100 with one or more physical configurations specified by the relocatable print data. In an alternate embodiment, the spatial print data 155 is directed to the VFM 105 specified by the user. In a certain embodiment, the spatial print data 155 is directed to the VFM 105 residing in the printer 210. The interface module 415 communicates the spatial print data 155 to the printer 210. The computer 205 organizes relocatable print data from text information 135. In addition, the computer 205 calculates spatial print data 155 directed to the VFM 105.

Figure 5:
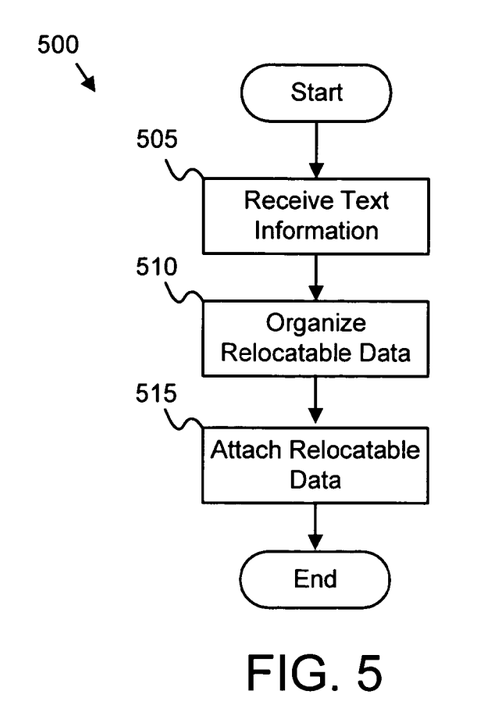
FIG. 5 is a flow chart diagram illustrating one embodiment of a relocatable print data process of the present invention.

FIG. 5 depicts a flow chart diagram illustrating one embodiment of a relocatable print data process 500 of the present invention. The relocatable print data process 500 organizes relocatable print data from text information 135. Although for purposes of clarity the relocatable print process 500 is depicted in a certain sequential order, execution may be conducted in parallel and not necessarily in the depicted order.

The relocatable print process 500 receives 505 the text information 135. In one embodiment, the text information 135 is received from an application program. In an alternate embodiment, the text information 135 is received from a software application such as a data base application, an order entry application, and an identification application. The relocatable print process 500 organizes 510 the text information 135 as the relocatable print data. The relocatable print data specifies the text information 135 independent of position, orientation, and dimensions. The relocatable print process 500 further attaches 515 the relocatable print data to a document. In one embodiment, the relocatable print process 500 integrates the relocatable print data within the document. In an alternate embodiment, the relocatable print process 500 associates the relocatable print data with the document. The relocatable print data associated with the document may be communicated to a rendering device such as a printer 210 with the document. In a certain embodiment, the relocatable print data is attached to one or more documents. The relocatable print process 500 organizes relocatable print data from text information that may be directed to a VFM 105.

Figure 6:
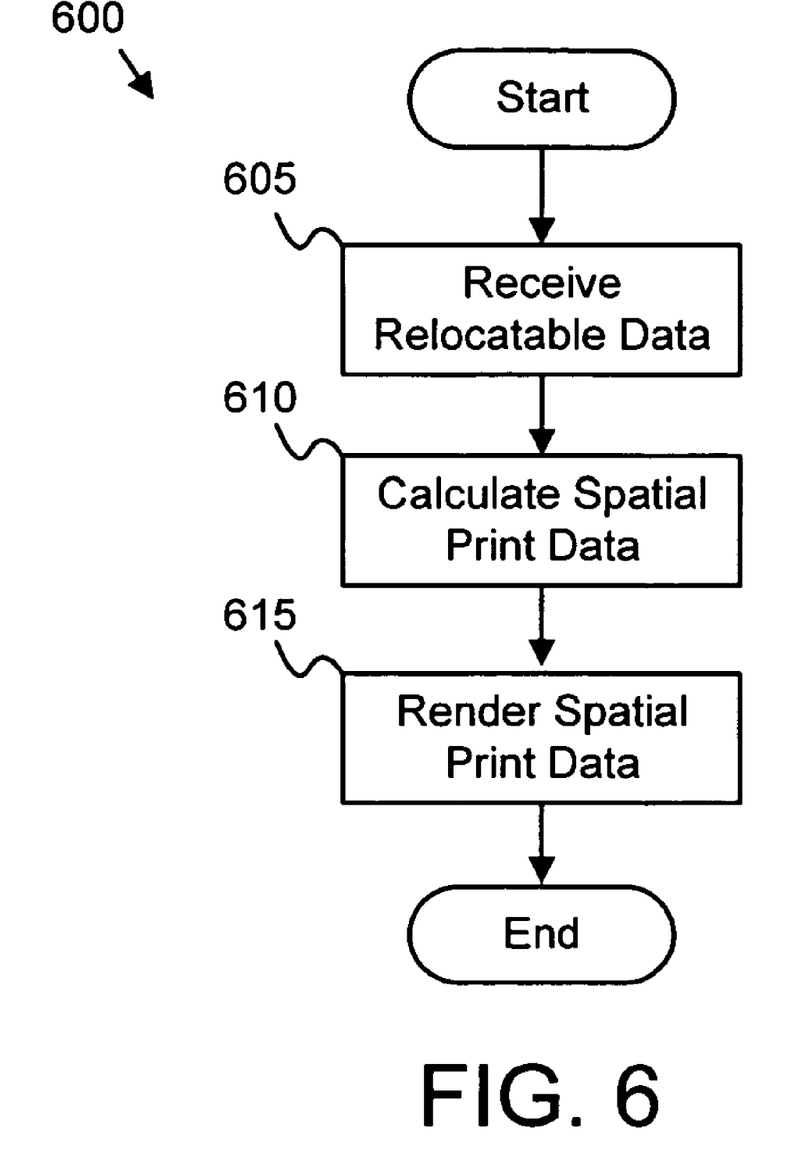
FIG. 6 is a flow chart diagram illustrating one embodiment of a printing process of the present invention.

FIG. 6 depicts a flow chart diagram illustrating one embodiment of a printing process 600 of the present invention. The printing process 600 prints relocatable print data on a VFM 105. Although for purposes of clarity the printing process 600 is depicted in a certain sequential order, execution may be conducted in parallel and not necessarily in the depicted order.

The printing process 600 receives 605 relocatable print data. In one embodiment, the relocatable print data specifies a set of VFM 105 with one or more specified physical dimensions. A specified physical dimension may be a two-centimeter (2 cm) by five-centimeter (5 cm) tab. In an alternate embodiment, the relocatable print data specifies a VFM 105 with a general functional description. The printing process 600 calculates 610 spatial print data 155 directed to one or more print targets 115 of the VFM 105. The spatial print data 155 specifies the position, orientation, and dimensions of the relocatable print data.

In one embodiment, the printing process 600 calculates 610 the spatial print data 155 for a VFM 105 from the set of VFM 100 specified by the relocatable print data. In an alternate embodiment, the print process 600 calculates 610 the spatial print data 155 directed to the VFM 105 residing in a printer 210. In a certain, embodiment, the print process 600 calculates 610 the spatial print data 155 directed to the VFM 105 selected by the cod user.

The printing process 600 renders 615 the spatial print data 155. In one embodiment, the printing process 600 renders 615 the spatial print data 155 as printing on the VFM 105. In an alternate embodiment, the printing process 600 renders 615 an image of the spatial print data 155 and the VFM 105 on a display. In a certain embodiment, the printing process 600 renders the spatial print data 155 as a web page. The printing process 600 renders relocatable print data as spatial print data 155 on a VFM 105.

Figure 7:
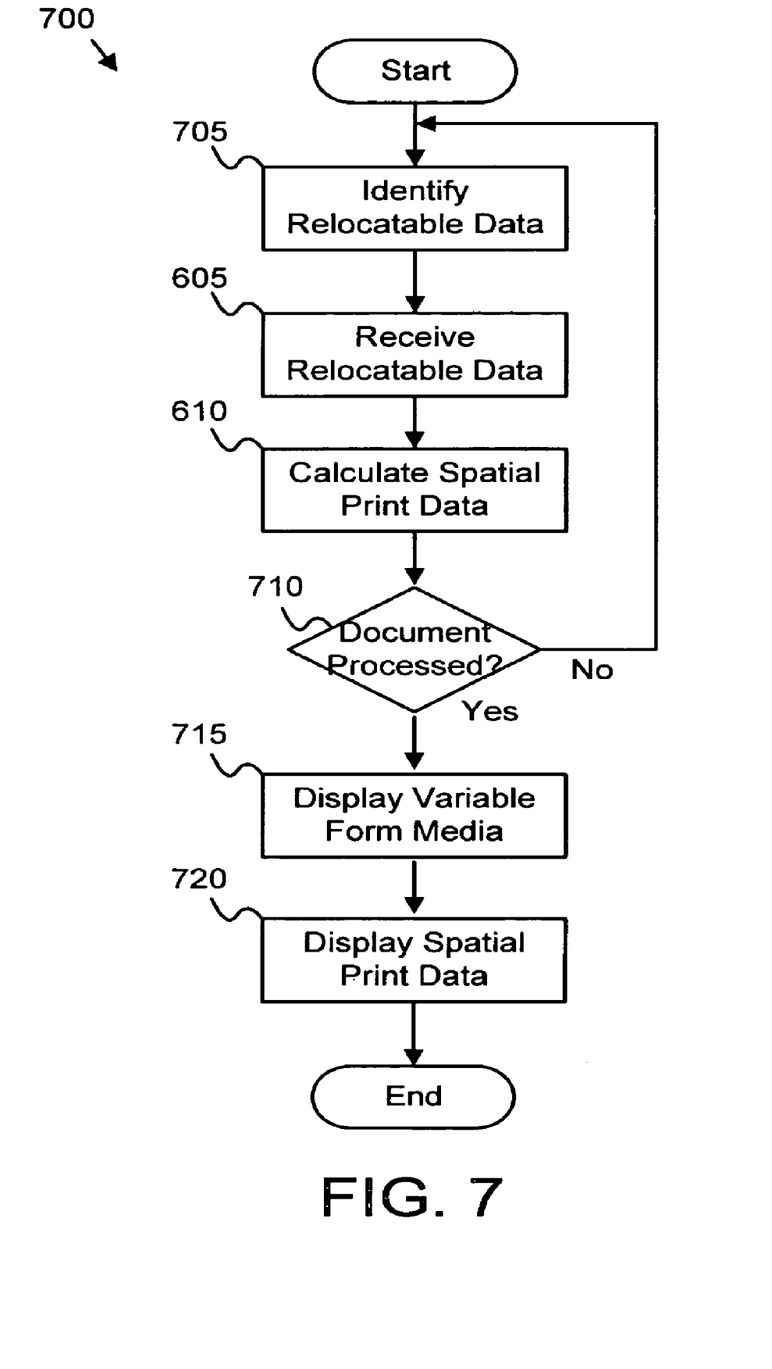
FIG. 7 is a flow chart diagram illustrating one embodiment of a display process of the present invention.

FIG. 7 depicts a flow chart diagram illustrating one embodiment of a display process 700 in accordance with the present invention. The display process 700 displays one or more sets of relocatable print data rendered upon a set of VFM 100. Although for purposes of clarity the display process 700 is depicted in a certain sequential order, execution may be conducted in parallel and not necessarily in the depicted order.

The display process 700 identifies 705 relocatable print data. In one embodiment, the relocatable print data is included in a job ticket appended to a document. In an alternate embodiment, the relocatable print data is integrated in the document. The display process 700 receives 605 the relocatable print data and calculates 610 spatial print data 155 as described for FIG. 6.

The display process 700 determines 710 if all the relocatable print data associated with the document has been processed. In one embodiment, if portions of the document that may contain relocatable print data remain to be processed, the display process 700 loops to identify 705 relocatable print data. In an alternate embodiment, if a job ticket appended to the document remains to be processed, the display process 700 loops to identify 705 relocatable print data.

If the display process 700 determines 710 that all relocatable print data associated with the document has been processed, the display process 700 proceeds to display 715 the VFM 105. In one embodiment, each VFM 105 is displayed 715 in a separate area of a display. In an alternate embodiment, the VFM 105 are displayed as stacked media. A first VFM 105a may be designated as forward relative to a second rearward VFM 105b. The display image of the forward VFM 105a may occlude portions of the second rearward VFM 105b. In a certain embodiment, VFM 105 displayed as stacked media may be offset horizontally. VFM 105 displayed as stacked media may also be offset vertically.

The display process 700 further displays 720 spatial print data 155 for each VFM 105. In one embodiment, the forward VFM 105a may occlude the spatial print data 155 on the rearward VFM 105b. The display process 700 displays one or more VFM 105 with the spatial print data 155 as the spatial print data 155 would appear printed on each VFM 105.

The present invention organizes relocatable print data from text information 135. The relocatable print data specifies the text information 135 independent of position, orientation, and dimensions. The present invention further calculates spatial print data 155 directed to a VFM 105 from the relocatable print data. The spatial print data 155 specifies the position, orientation, and dimensions of the text information 135. The present invention prints the spatial print data 155 on the VFM 105. Alternately, the present invention may render the spatial print data 155 and the VFM 105 on a display. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A printer comprising:
   a print interface module operable to receive a print datastream that includes relocatable text print data for printing text on a tab portion of variable form media, wherein the relocatable text print data specifies the text independent of a physical configuration of the tab portion of the variable form media, and wherein the relocatable text print data specifies the physical configuration of the tab portion of the variable form media;
   a print processor module operable to process the relocatable text print data in the print datastream to identify the physical configuration of the tab portion of the variable form media, to calculate spatial print data based on the relocatable text print data and the identified physical configuration, wherein the spatial print data specifies a position of the text for placement on the tab portion of the variable form media; and
   a print engine operable to print the spatial print data on the tab portion of the variable form media.

2. The printer of claim 1 wherein the print interface module is further operable to receive the relocatable text print data within one of a print job ticket or a document.

3. The printer of claim 1 wherein the relocatable text print data specifies a variable form media with a pre-determined physical configuration.

4. The printer of claim 1 wherein the print interface module is further operable to receive a request for the physical configuration of the variable form media from a computer, to query a paper feed module to identify a physical configuration of the tab portion of variable form media loaded at the printer, and to transmit the physical configuration to the computer in response to the request.

5. A method operable on a printer, the method comprising:
   receiving a print datastream that includes relocatable text print data at the printer for printing text on a tab portion of variable form media, wherein the relocatable text print data specifies the text independent of a physical configuration of the tab portion of the variable form media, and wherein the relocatable text print data specifies the physical configuration of the tab portion of the variable form media;
   processing at the printer the relocatable text print data in the print datastream to identify the physical configuration of the tab portion of the variable form media;
   calculating at the printer spatial print data based on the relocatable print data and the identified physical, wherein the spatial print data specifies a position of the text for placement on the tab portion of the variable form media; and
   printing the spatial print data on the tab portion of the variable form media at the printer.

6. The method of claim 5 wherein receiving the relocatable text print data further comprises:
   receiving the relocatable text print data within one of a print job ticket or a document.

7. The method of claim 5 wherein the relocatable text print data specifies a variable form media with a pre-determined physical configuration.

8. The method of claim 5 further comprising:
   receiving a request at the printer for the physical configuration of the variable form media from a computer;
   identifying a physical configuration of the tab portion of variable form media loaded at the printer; and
   transmitting the physical configuration from the printer to the computer in response to the request.

9. A non-transitory computer readable medium tangibly embodying programmed instructions which, when executed by a print processor of a printer, are operable for performing a method on a printer, the method comprising:
   receiving a print datastream that includes relocatable text print data at the printer for printing text on a tab portion of variable form media, wherein the relocatable text print data specifies the text independent of a physical configuration of the tab portion of the variable form media, and wherein the relocatable text print data specifies the physical configuration of the tab portion of the variable form media;
   processing the relocatable text print data in the print datastream to identify the physical configuration of the tab portion of the variable form media;
   calculating at the printer spatial print data based on the relocatable text print data and the identified physical configuration, wherein the spatial print data specifies a position of the text for placement on the tab portion of the variable form media; and
   printing the spatial print data on the tab portion of the variable form media at the printer.

10. The computer readable medium of claim 9 wherein receiving the relocatable text print data further comprises:
    receiving the relocatable text print data within one of a print job ticket or a document.

11. The computer readable medium of claim 9 wherein the relocatable text print data specifies a variable form media with a pre-determined physical configuration.

12. The computer readable medium of claim 9 wherein the method further comprises:

receiving a request at the printer for the physical configuration of the variable form media from a computer;
identifying a physical configuration of the tab portion of the variable form media loaded at the printer; and
transmitting the physical configuration from the printer to the computer in response to the request.

* * * * *